(12) United States Patent
Deng et al.

(10) Patent No.: US 10,857,966 B2
(45) Date of Patent: Dec. 8, 2020

(54) FRONT AIRBAG RESTRAINT SYSTEM FOR VEHICLE

(71) Applicant: Ford Global Technologies, LLC, Dearborn, MI (US)

(72) Inventors: Zhibing Deng, Northville, MI (US); Alison Callaghan, Royal Oak, MI (US); Tzu-Chen Weng, Troy, MI (US); Krishnakanth E. Aekbote, Novi, MI (US); Srinivas Reddy Malapati, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 77 days.

(21) Appl. No.: 16/113,392

(22) Filed: Aug. 27, 2018

(65) Prior Publication Data
US 2020/0062211 A1 Feb. 27, 2020

(51) Int. Cl.
*B60R 21/233* (2006.01)
*B60R 21/206* (2011.01)
*B60R 21/216* (2011.01)
*B60R 21/00* (2006.01)
(Continued)

(52) U.S. Cl.
CPC .......... *B60R 21/233* (2013.01); *B60R 21/206* (2013.01); *B60R 21/216* (2013.01); *B60R 2021/0004* (2013.01); *B60R 2021/0051* (2013.01); *B60R 2021/161* (2013.01); *B60R 2021/23107* (2013.01); *B60R 2021/23169* (2013.01); *B60R 2021/23308* (2013.01)

(58) Field of Classification Search
CPC ... B60R 21/233; B60R 21/206; B60R 21/216; B60R 2021/23107; B60R 2021/23308; B60R 2021/23382; B60R 21/205

USPC ...................................................... 280/730.1
See application file for complete search history.

(56) References Cited

U.S. PATENT DOCUMENTS 3,642,303 A * 2/1972 Irish .................... B60R 21/233
280/730.1
4,043,572 A * 8/1977 Hattori .................. B60R 21/30
280/738
5,775,729 A 7/1998 Schneider et al.
(Continued)

FOREIGN PATENT DOCUMENTS

DE 102007051281 A1 * 4/2009 .......... B60R 21/231
DE 102010005530 A1 * 7/2011 .......... B60R 21/205
DE 102012019581 A1 * 4/2013 .......... B60R 21/233

OTHER PUBLICATIONS

Machine Translation of DE102012019581 (Year: 2012).*

*Primary Examiner* — James A English
*Assistant Examiner* — Kurtis Nielson
(74) *Attorney, Agent, or Firm* — Frank A. MacKenzie; Bejin Bieneman PLC (57) ABSTRACT

A vehicle includes a system including an instrument panel, a knee airbag, and a front airbag assembly. The knee airbag is inflatable downwardly from the instrument panel. The front airbag assembly is inflatable upwardly from the instrument panel. The front airbag assembly may be spaced from a windshield of the vehicle when the front airbag assembly is in the inflated position such that the windshield does not act as a reaction surface for the front airbag assembly, and the front airbag assembly is designed to control the kinematics of the occupant without using the windshield as a reaction surface.

18 Claims, 5 Drawing Sheets

(51) Int. Cl.
*B60R 21/16* (2006.01)
*B60R 21/231* (2011.01)

(56) References Cited

U.S. PATENT DOCUMENTS

| | | | | |
|---|---|---|---|---|
| 6,464,255 B1* | 10/2002 | Preisler | ................ | B60R 21/206 280/732 |
| 6,971,664 B2* | 12/2005 | Amamori | .............. | B60R 21/231 280/729 |
| 7,210,701 B2* | 5/2007 | Meissner | .............. | B60R 21/231 280/729 |
| 7,540,531 B2* | 6/2009 | Sakakibara | ........... | B60R 21/206 280/728.3 |
| 7,950,688 B2* | 5/2011 | Kotikovsky | .............. | B60R 7/06 280/728.2 |
| 8,181,990 B2* | 5/2012 | Maripudi | .............. | B60R 21/233 280/732 |
| 8,408,593 B2 | 4/2013 | Kuhlmann | | |
| 8,414,022 B2* | 4/2013 | Song | ..................... | B60R 21/205 280/729 |
| 9,487,177 B2 | 11/2016 | Schneider et al. | | |
| 2002/0149181 A1* | 10/2002 | Eyrainer | ............... | B60R 21/213 280/730.1 |
| 2008/0054602 A1* | 3/2008 | Yang | ..................... | B60R 21/231 280/729 |
| 2011/0018240 A1* | 1/2011 | Marable | .............. | B60R 21/2338 280/728.3 |
| 2011/0198828 A1* | 8/2011 | Fischer | ................ | B60R 21/233 280/743.2 |
| 2012/0025498 A1* | 2/2012 | Tanaka | ................. | B60R 21/233 280/730.2 |
| 2012/0104734 A1* | 5/2012 | Fischer | ............... | B60R 21/2338 280/730.1 |
| 2014/0232093 A1* | 8/2014 | Jacqmarcq | ........... | B60R 21/233 280/736 |
| 2015/0151707 A1* | 6/2015 | Chen | .................... | B60R 21/233 280/730.1 |

* cited by examiner

FRONT AIRBAG RESTRAINT SYSTEM FOR VEHICLE

BACKGROUND

Vehicles are equipped with a restraint system to control the kinematics of occupants inside the vehicle. A front airbag assembly is housed in an instrument panel. The front airbag assembly receives the occupant during a vehicle impact. In the inflated position, the front airbag contacts a windshield and the windshield acts as a reaction surface to support the front airbag as the occupant pushes the front airbag toward the windshield.

DETAILED DESCRIPTION

A system includes an instrument panel, a knee airbag inflatable downwardly from the instrument panel, and a front airbag assembly inflatable upwardly from the instrument panel.

The front airbag assembly may include a first chamber inflatable to a first pressure in an inflated position and a second chamber inflatable to a second pressure in an inflated position.

The system may include a panel between the first chamber and the second chamber.

The panel may completely separate the first chamber and the second chamber.

The system may include a tether in the first chamber extending along the panel.

The first chamber may be a front airbag and the second chamber may be a support airbag abutting the front airbag and the instrument panel in the inflated position.

The front airbag assembly may include a top panel along the first chamber, and a tether in the first chamber, connected to the top panel adjacent the second chamber.

The second chamber may abut the instrument panel in the inflated position.

In the inflated position, the second chamber may be between the instrument panel and the first chamber.

The second chamber may abut the instrument panel in the inflated position.

The system may include a windshield, the second chamber being between the windshield and the first chamber in the inflated position.

The second chamber may abut the instrument panel and may be spaced from the windshield in the inflated position.

The volume of the second chamber in the inflated position may be less than the volume of the first chamber in the inflated position.

The system may include an inflator fluidly connected to at least two of the knee airbag, the first chamber, and the second chamber.

The system may include a deflector adjacent the knee airbag and pivotally connected to the instrument panel.

The deflector may include a tether connected to the instrument panel.

A system may include an instrument panel, a knee airbag inflatable downwardly from the instrument panel, a front airbag inflatable upwardly and rearwardly from the instrument panel and including a top panel, and a housing fixed to the instrument panel and a tether extending from the top panel to the housing and tapering from the top panel to the housing.

The tether may extend forwardly from the housing to the top panel in an inflated position.

The top panel may include an apex and the tether may be connected forwardly from the apex.

The system may include a deflector adjacent the knee airbag and pivotally connected to the instrument panel.

The system may include a windshield, the front airbag being spaced from the windshield in an inflated position.

With reference to the Figures, wherein like numerals indicate like parts throughout the several views, a vehicle 10 includes a restraint system 12 including an instrument panel 14, a knee airbag 16, and a front airbag assembly 18, 118, 218. The knee airbag 16 is inflatable downwardly from the instrument panel 14. The front airbag assembly 18, 118, 218 is inflatable upwardly from the instrument panel 14.

During a vehicle 10 impact, the front airbag assembly 18, 118, 218 and the knee airbag 16 are inflated. The head and/or the torso of the occupant impact the front airbag assembly 18, 118, 218 and the legs of the occupant impact the knee airbag 16. When impacted by the occupant, the occupant pushes the front airbag assembly 18, 118, 218 toward the instrument panel 14 and the instrument panel 14 acts as a reaction surface for the front airbag assembly 18, 118, 218 such that the front airbag assembly 18, 118, 218 is squeezed between the occupant and the instrument panel 14 to control the kinematics of the occupant. The front airbag assembly 18, 118, 218 may be spaced from a windshield 20 of the vehicle 10, as set forth below, when the front airbag assembly 18, 118, 218 is in the inflated position such that the windshield 20 does not act as a reaction surface for the front airbag assembly 18, 118, 218. The knee airbag 16 urges the occupant to remain in an upright position when the knees of the occupant impact the knee airbag 16 to position the head and/or torso of the occupant relative to the front airbag assembly 18, 118, 218.

Figure 1:
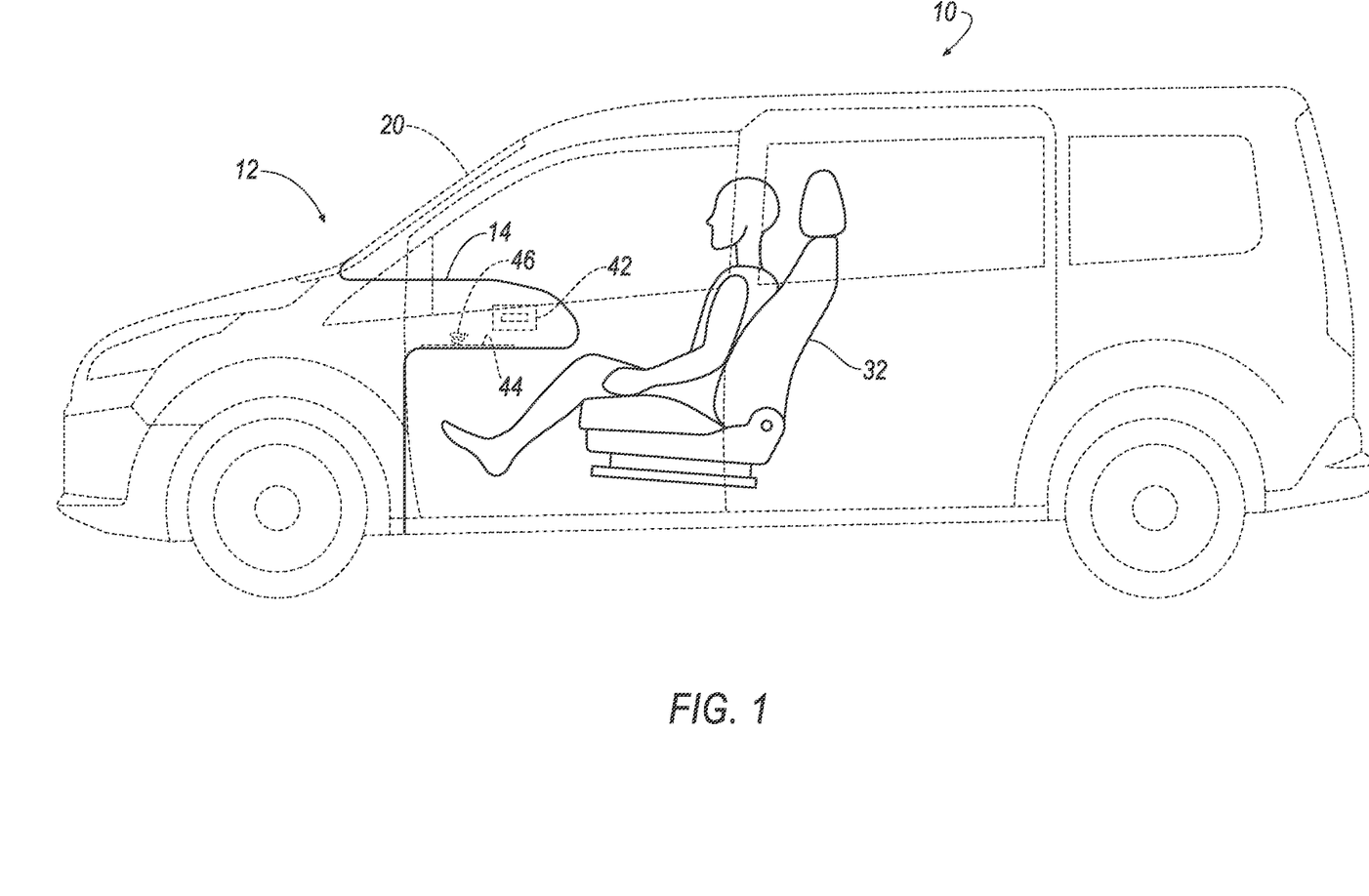
FIG. 1 is a side view of a vehicle including a restraint system.
Figure 2:
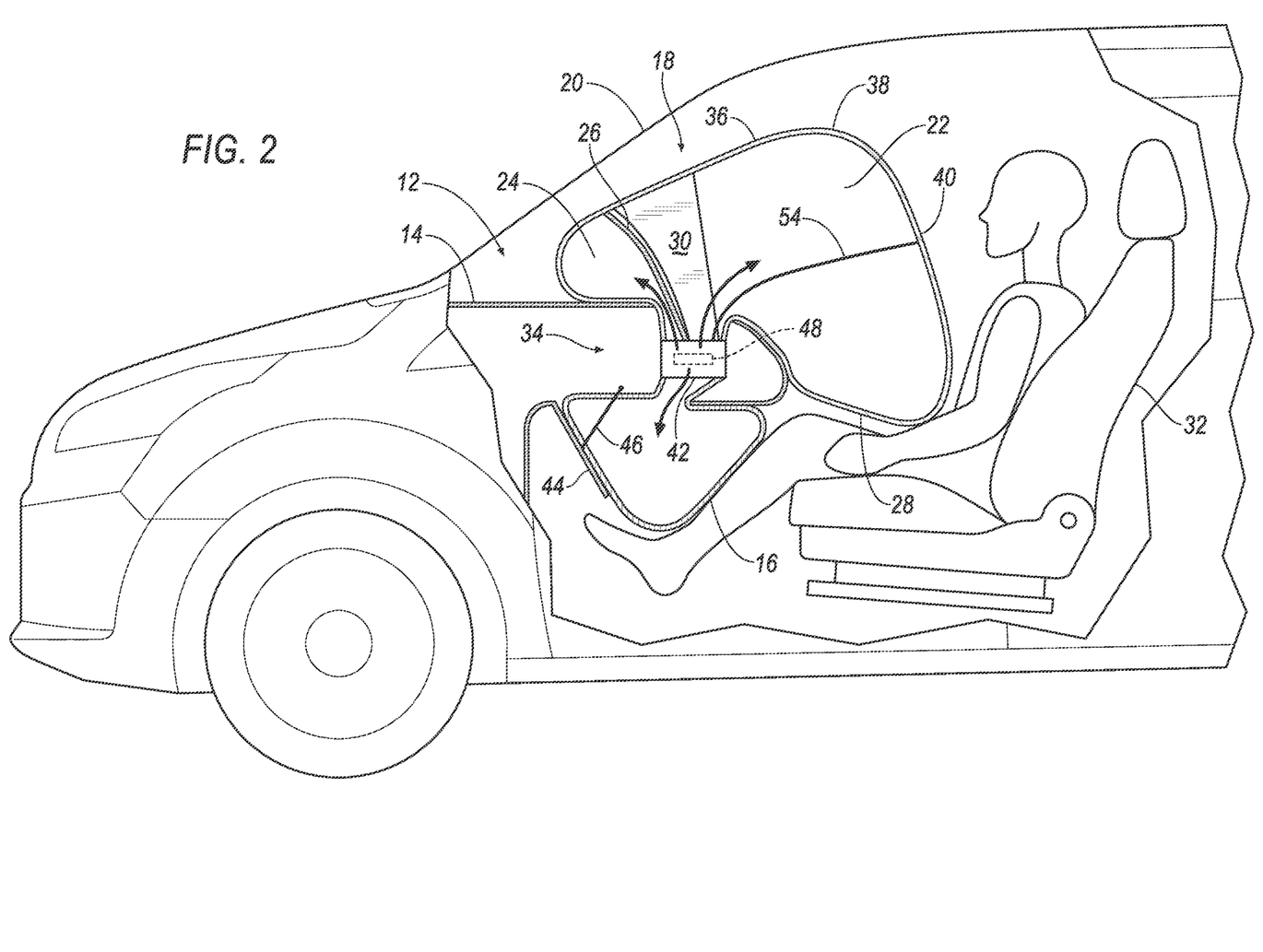
FIG. 2 is a cross-sectional view of the restraint system including an airbag assembly in the inflated position.
Figure 3:
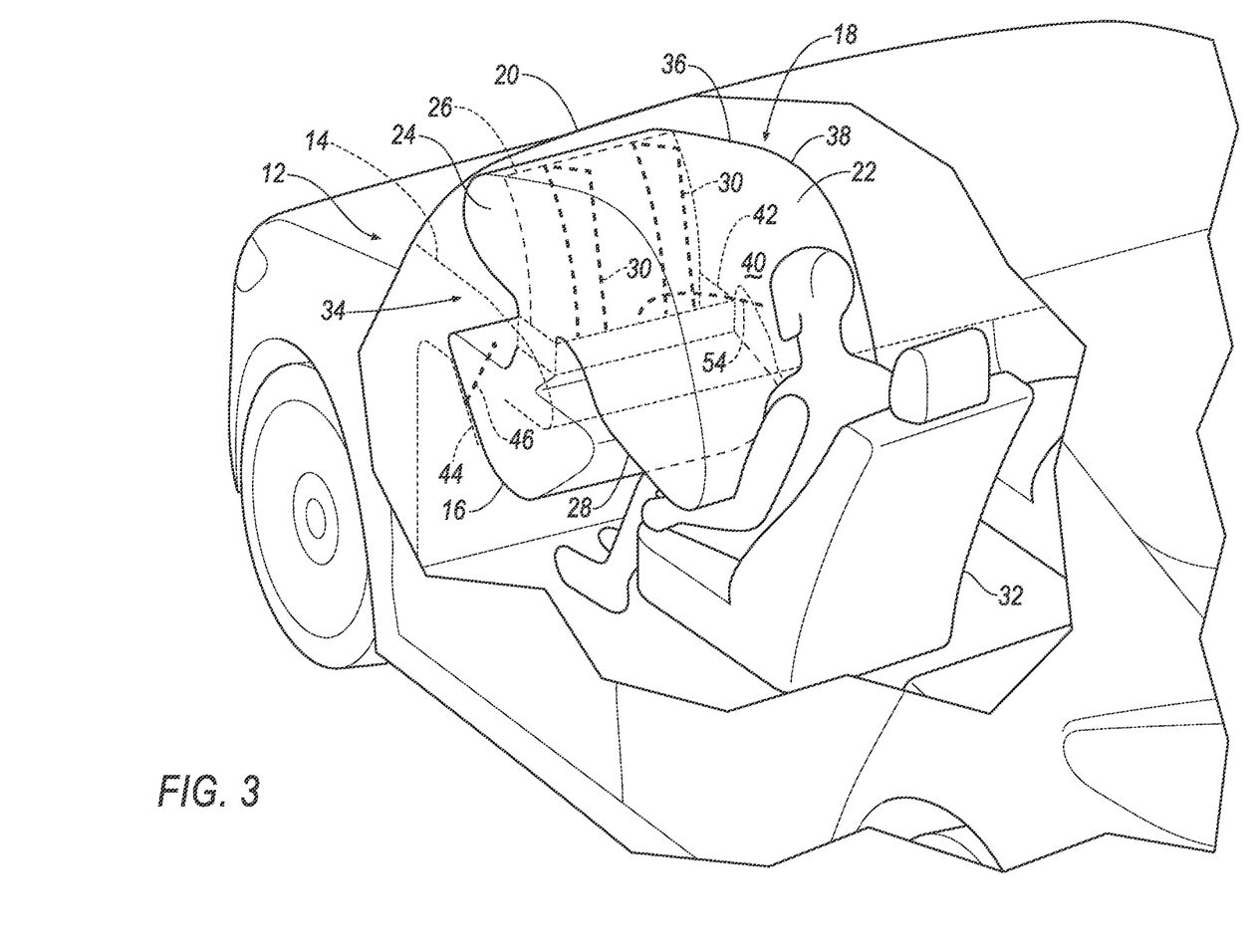
FIG. 3 is a perspective view of the restraint system of FIG. 2 with the airbag assembly in the inflated position.
Figure 4:
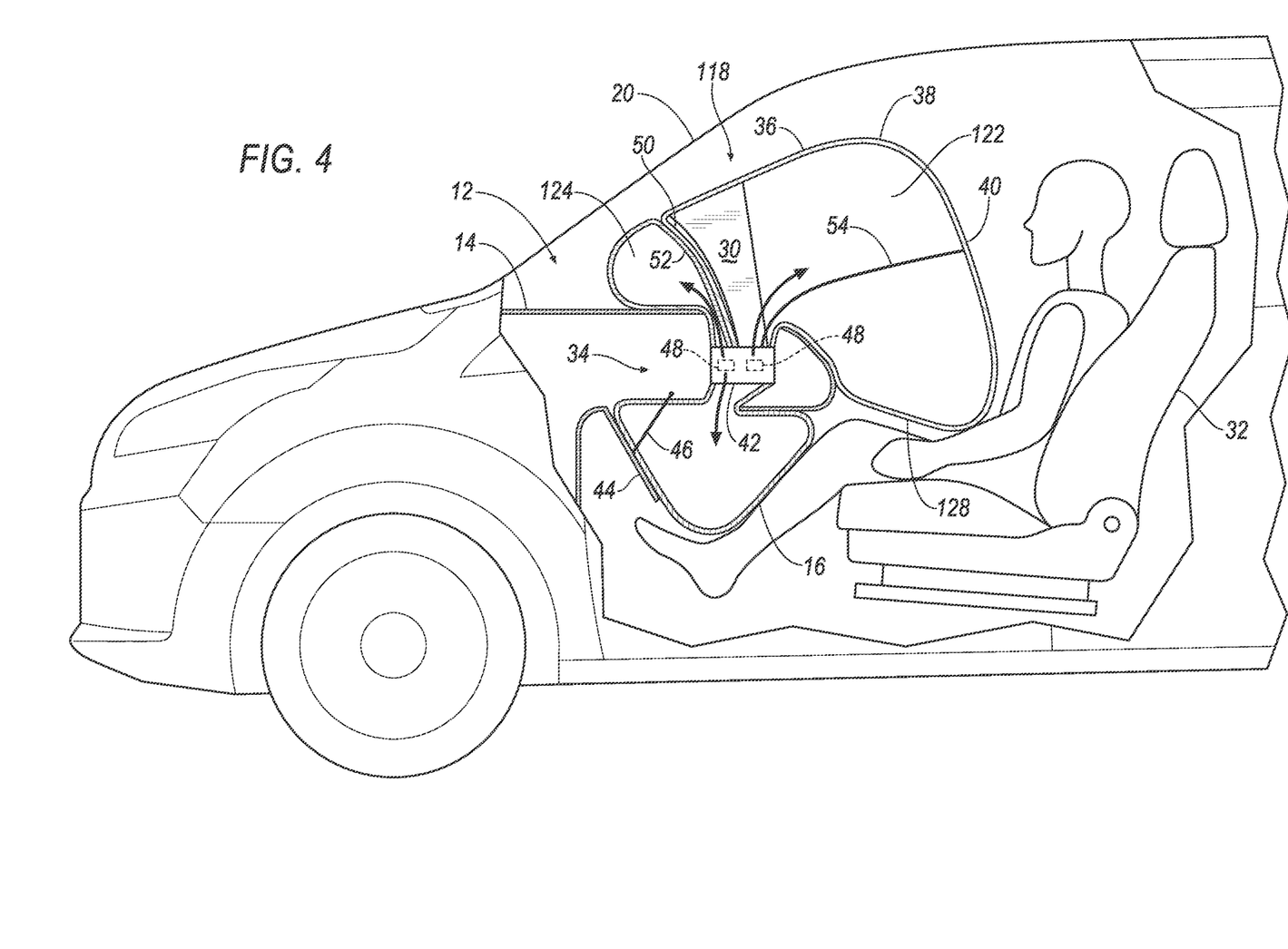
FIG. 4 is a cross-sectional view of the restraint system with another embodiment of the airbag assembly in the inflated position.
Figure 5:
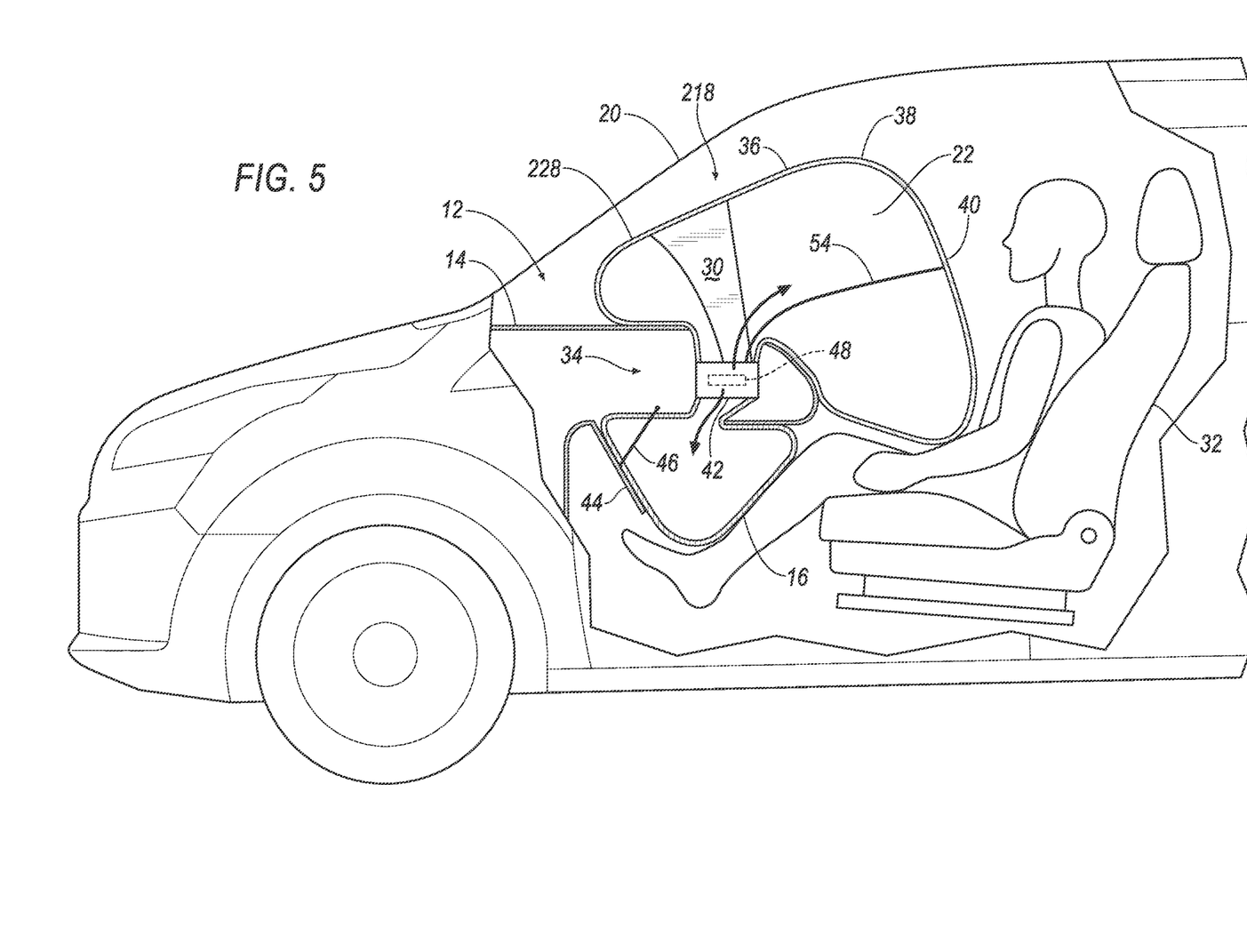
FIG. 5 is a cross-sectional view of the restraint system with yet another embodiment of the airbag assembly in the inflated position.

As set forth below, one embodiment of the front airbag assembly 18 is shown in FIGS. 2 and 3 in which the front airbag assembly 18 includes a first chamber 22 a second chamber 24 and a panel 26 between the first chamber 22 and the second chamber 24. Another embodiment of the front airbag assembly 118 is shown in FIG. 4 in which the first chamber 122 is a front airbag 128 and the second chamber 124 is a support airbag, i.e., the front airbag assembly 118 includes two separate airbags. Another embodiment of the front airbag assembly 218 is shown in FIG. 5 in which the front airbag assembly 218 includes a front airbag 228 and a tether 30 fixed to the front airbag 228. Common numerals are used to identify common features in FIGS. 2-5. The restraint system 12 is shown in FIGS. 2-5 as being at a front-left position of the vehicle 10 as an example, and the restraint system 12 may be positioned at any cross-vehicle position along the instrument panel 14. The vehicle 10 may include any suitable number of restraint systems.

The vehicle 10 may be any passenger or commercial automobile such as a car, a truck, a sport utility vehicle, a crossover vehicle, a van, a minivan, a taxi, a bus, etc. The vehicle 10 may be an autonomous vehicle and operate in an autonomous mode, a semi-autonomous mode, or a manual mode. For purposes of this disclosure, an autonomous mode is defined as one in which each of a propulsion system, a braking system, and a steering system of the vehicle 10 are controlled by the computer.

The vehicle 10 includes a passenger cabin to house occupants, if any, of the vehicle 10. The passenger cabin includes one or more front seats 32 disposed at a front of the passenger cabin. The passenger cabin may include one or more back seats disposed behind the front seats. The position and orientation of the seats and components thereof may be adjustable by an occupant.

The vehicle 10 includes the windshield 20. The windshield 20 is at the forward end of the passenger cabin. The windshield 20 is in a vehicle-forward direction of the instrument panel 14. The windshield 20 extends above the instrument panel 14. The windshield 20 may extend upwardly and over the occupant to provide the occupant with a panoramic view. As described further below, the windshield 20 may be spaced from the front airbag assembly 18, 118, 218 when the front airbag assembly 18, 118, 218 is inflated.

The instrument panel 14 may be disposed at a vehicle forward end of the passenger cabin and face the front seats 32. The instrument panel 14 may support vehicle controls, including a steering wheel, components of an HVAC system, an infotainment (information and entertainment) system, etc. In the case where the vehicle 10 is an autonomous vehicle, the instrument panel 14 may not include a steering wheel. The instrument panel 14, as an example, may be slim in that the instrument panel 14 is elongated rearwardly into the passenger cabin and sized to house only components of the HVAC system and the infotainment system and absent a steering wheel for autonomous operation.

The instrument panel 14 extends in a vehicle-rearward direction from the windshield 20. In the case of an autonomous vehicle, the instrument panel 14 may be elongated from the windshield 20, e.g., may be shelf-like. Where the vehicle 10 is an autonomous vehicle, the windshield 20 may be spaced from the instrument panel 14 such that when the front airbag assembly 18, 118, 218 inflates to the inflated position, the front airbag assembly 18, 118, 218 does not contact the windshield 20.

The restraint system 12 includes an airbag assembly 34. The airbag assembly 34 includes the front airbag assembly 18, 118, 218 and the knee airbag 16. The front airbag assembly 18, 118, 218 and the knee airbag 16 are both deployable from an uninflated position to the inflated position during a vehicle impact to control kinematics of occupants inside the vehicle 10 during the impact.

The front airbag assembly 18, 118, 218 expands upwardly from the instrument panel 14 and vehicle rearward direction toward the seat 32 when inflating from the uninflated to the inflated position. In other words, the front airbag assembly 18, 118, 218 controls the kinematics of the occupant, receiving the head and torso to restrain movement.

As set forth above, the front airbag assembly 18, 118, 218 includes the front airbag 28, 128, 228. The front airbag 28, 128, 228 includes a top panel 36. The top panel 36 includes an apex 38. Specifically, the top panel 36 may extend upwardly from a vehicle-forward end to the apex 38. The front airbag 28, 128, 228 includes an impact surface 40 and the impact surface 40 may extend downwardly from the apex 38 in a vehicle-rearward direction. The front airbag assembly 18, 118, 218 may include an internal tether 54 to shape the front airbag 28, 128, 228 to include the apex 38. The internal tether 54 may, for example, be connected to the impact surface 40 and may be connected to a housing of the front airbag assembly 18, 118, 218. A portion of the front airbag 28, 128, 228 may be disposed between the impact surface 40 and the instrument panel 14 at a bottom of the front airbag 28, 128, 228 such that the instrument panel 14 acts as a reaction surface for that portion of the front airbag 28, 128, 228. In FIGS. 2-4, for example, the apex 38 is on the first chamber 22, 122, and the first chamber 22, 122 includes the impact surface 40.

The tether 30 may extend from the housing 42 to the top panel 36 of the front airbag 28, 128, 228. Specifically, the tether 30 may be connected to the top panel 36 in a vehicle-forward position relative to the apex 38. The tether 30 may be fixed to the top panel 36 in any suitable way, e.g., stitching, adhesive, unitary construction, etc. As described further below, the tether 30 is in the front airbag 28, 128, 228. In FIGS. 2-4, for example, the tether 30 is in the first chamber 22, 122.

The front airbag assembly 18, 118, 218 includes the tether 30. The tether 30 reinforces the front airbag 28, 128, 228 in the vehicle-rearward direction so to support the front airbag 28, 128, 228 when impacted by the occupant. Specifically, when the impact surface 40 is impacted by the occupant, the occupant urges the impact surface 40 in the vehicle-forward direction, which pushes the top panel 36 in the vehicle-forward direction. Since the tether 30 is connected to the top panel 36 in a vehicle-forward position relative to the apex 38, the vehicle-forward movement of the top panel 36 pulls the tether 30 to place the tether 30 in tension. The tether 30 resists additional vehicle-forward movement of the top panel 36.

The tether 30 is elongated between a bottom connected to the housing 42 and a top connected to the top panel 36. The tether 30 may extend upwardly and in a vehicle-forward direction from the bottom to the top. The tether 30 has a width in a generally vehicle fore-and-aft direction. The tether 30 is relatively thin in the cross-vehicle direction, i.e., is sheet-like.

The tether 30 may taper from the top panel 36 to the housing 42. Specifically, the tether 30 tapers in a vehicle fore-and-aft direction. The tapering increases the interface between the tether 30 and the top panel 36.

The front airbag assembly 18, 118, 218 may include any suitable number of tethers 30 spaced from each other in a cross-vehicle direction. For example, the front airbag assembly 18, shown in FIG. 3 has two tethers 30.

With reference to FIGS. 2-4, the front airbag assembly 18, 118 may include a first chamber 22, 122 inflatable to a first pressure in an inflated position and a second chamber 24, 124 inflatable to a second pressure in an inflated position. Specifically, the second chamber 24, 124 may be inflatable to a pressure (i.e., the second pressure) greater than the pressure (i.e., the first pressure) of the first chamber 22, 122 when in the inflated position. In such a configuration, the second chamber 24, 124 acts as a reaction surface for the first chamber 22, 122 such that the first airbag is squeezed between the occupant and the second airbag and the second airbag positions the first airbag to control the kinematics of the occupant. In examples where the front airbag assembly 18, 118 includes the tether 30 and the second chamber 24, 124 is at a greater pressure than the first chamber 22, 122 (for example, in FIGS. 2-4), the tether 30 and the second chamber 24, 124 work in combination to position the first chamber 22, 122 to control the kinematics of the occupant. In the examples in FIGS. 2-4, the first chamber 22, 122 includes the top panel 36. In such examples, the first chamber 22, 122 may include the tether 30 in the first chamber 22, 122.

With continued reference to FIGS. 2-4, the second chamber 24, 124 abuts the instrument panel 14 in the inflated position. In the inflated position, the second chamber 24, 124 is between the instrument panel 14 and the first chamber 22, 122. Specifically, the second chamber 24, 124 is between the windshield 20 and the first chamber 22, 122 in the inflated position.

The volume of the second chamber 24, 124 in the inflated position may be less than the volume of the first chamber 22, 122 in the inflated position. This configuration allows the second chamber 24, 124 to be inflated to the second pressure greater the first pressure of the first chamber 22, 122 in the inflated position.

In the embodiment shown in FIGS. 2-3, the front airbag assembly 18 may include the panel 26 in the front airbag 28 between the first chamber 22 and the second chamber 24. The panel 26 completely separates the first chamber 22 and the second chamber 24. In other words, the panel 26 allows no fluid communication between the first chamber 22 and the second chamber 24. The panel 26 may be fixed to the front airbag 28 in any suitable fashion, e.g., stitching, adhesive, unitary construction, etc.

With continued reference to the embodiment shown in FIGS. 2-3, the tether 30 may extend along the panel 26. The tether 30 in the first chamber 22 extends from a bottom of the panel 26 to a top of the panel 26. The tether 30 may be adjacent the panel 26, i.e., with the lack of anything between the panel 26 and the tether 30. In such an example the tether 30 may abut the panel 26 or may be spaced from the panel 26. The tether 30 may be fixed to the panel 26. As examples, the tether 30 may be fixed to the panel 26 in any suitable fashion, e.g., stitching, adhesive, unitary construction, etc.

In the embodiment shown in FIG. 4, the first chamber 122 may be the front airbag 128 and the second chamber 124 may be a support airbag. In other words, the first chamber 122, and the second chamber 124, are separate airbags. Specifically, the first chamber 122, includes a first inflation chamber and the second chamber 124, includes a second inflation chamber, and the first chamber 122, and the second chamber 124, each includes a panel 50, 52 abutting each other between the first inflation chamber and the second inflation chamber.

In the embodiment shown in FIG. 4, the tether 30 is in the front airbag 128. The tether 30 may extend along the panel 50. The tether 30 in the first chamber 122 extends from a bottom of the panel 50 to a top of the panel 50. The tether 30 may be adjacent the panel 50, i.e., with the lack of anything between the panel 50 and the tether 30. In such an example the tether 30 may abut the panel 50 or may be spaced from the panel 50. The tether 30 may be fixed to the panel 50. As examples, the tether 30 may be fixed to the panel 50 in any suitable fashion, e.g., stitching, adhesive, unitary construction, etc.

In the embodiment shown in FIG. 5, the front airbag assembly 218 includes a single chamber, i.e., the front airbag 228. In the inflated position, the front airbag 228 extends from the impact panel 26 to a vehicle-forward end that abuts the instrument panel 14 adjacent the windshield 20.

The knee airbag 16 expands downwardly from the instrument panel 14 from the uninflated position to the inflated position. In the inflated position, the knee airbag 16 is positioned below the front airbag assembly 18, 118, 218.

The knee airbag 16 receives the knees and legs of the occupant. The knee airbag 16 may be sized and positioned to contact the knees of the occupant sitting in the seat 32 in the inflated position. The knee airbag 16 may block forward movement of the shins of the occupant.

The front airbag assembly 18, 118, 218 and the knee airbag 16 may be formed of a woven polymer or any other material. Examples include woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane. The tethers 30 may be the same or a different type of material than the front airbag 28, 128, 228.

The instrument panel 14 may include a deflector 44 adjacent the knee airbag 16 and pivotally connected to the instrument panel 14. The deflector 44 may position the knee airbag 16 in the inflated position.

A tether 46 may be connected to the instrument panel 14 and the deflector 44. During impact, the knee airbag 16 may inflate to the inflated position. The deflector 44 may pivot downwardly away from the instrument panel 14. The tether 46 may stop the pivotal motion of the deflector 44 to position the knee airbag 16 in the inflated position.

The restraint system 12 includes the housing 42 fixed to the instrument panel 14. The housing 42 houses the front airbag assembly 18, 118, 218 and the knee airbag 16 assembly in the uninflated position and supports the front airbag assembly 18, 118, 218 and the knee airbag 16 in the inflated position.

With reference to FIGS. 2, 4, and 5, the airbag assembly 34 includes at least one inflator 48. As one example, as shown in FIGS. 2 and 5, the restraint system 12 may include one inflator 48 that inflates both the front airbag assembly 18, 218 and the knee airbag 16. In FIG. 2, the inflator 48 inflates both the first chamber 22 and the second chamber 24 of the front airbag assembly 18. As another example, as shown in FIG. 4, the restraint system 12 may include one inflator 48 in fluid communication with the second chamber 124 and the knee airbag 16 and another inflator 48 in fluid communication with the first chamber 122. Alternatively, the airbag assembly 34 includes any suitable number of inflators 48. In any event the inflator 48 is in fluid communication with the respective airbags/chambers to provide inflation medium to the respective airbags/chambers.

Upon receiving a signal from, e.g., the vehicle controller, the inflator 48 may inflate the respective airbag with an inflatable medium, such as a gas. The inflator 48 may be, for example, a pyrotechnic inflator that uses a chemical reaction to drive inflation medium to the respective airbag. The inflator 48 may be of any suitable type, for example, a cold-gas inflator.

During a vehicle 10 impact, the front airbag assembly 18, 118, 218 and the knee airbag 16 assembly are inflated to the inflated position. As shown in FIGS. 2-5, the tether 30 reinforces the front airbag 28, 128, 228 in the vehicle-rearward direction so to support the front airbag 28, 128, 228 when impacted by the occupant. Specifically, since the tether 30 is connected to the top panel 36 in in a vehicle-forward position relative to the apex 38, the vehicle-forward movement of the top panel 36 caused by impact by the occupant pulls the tether 30 to place the tether 30 in tension. The tether 30 resists additional vehicle-forward movement of the top panel 36. In the embodiment in FIG. 2, the second chamber 24, being at a higher pressure than the first chamber 22, also acts as a reaction surface when the first chamber 22, squeezes the second chamber 24 between the first chamber 22 and the instrument panel 14 adjacent the windshield 20. In FIG. 4, the support airbag, being at a higher pressure than the front airbag 128, also acts as a reaction surface when the front airbag 128, squeezes the support airbag between the front airbag 128 and the instrument panel 14 adjacent the windshield 20. In each of these examples, the front airbag assembly 18, 118, 218 controls the kinematics of the occupant without needing to use the windshield 20 as a reaction surface.

The disclosure has been described in an illustrative manner, and it is to be understood that the terminology which has been used is intended to be in the nature of words of description rather than of limitation. The adjectives "first," "second," etc., are used throughout this document as identifiers and are not intended to signify importance or order. Many modifications and variations of the present disclosure are possible in light of the above teachings, and the disclosure may be practiced otherwise than as specifically described.

What is claimed is:

1. A system comprising:
an instrument panel;
a windshield;
a knee airbag inflatable downwardly from a first opening in the instrument panel; and
a front airbag assembly inflatable upwardly from a second opening in the instrument panel, the first opening being spaced from the second opening;
wherein the front airbag assembly includes a first chamber inflatable to a first pressure in an inflated position and a second chamber inflatable to a second pressure in an inflated position, the second pressure being greater than the first pressure;
the second chamber being between the windshield and the first chamber in the inflated position; and
the second chamber abuts the instrument panel and is spaced from the windshield in the inflated position.

2. The system of claim 1, further comprising a panel between the first chamber and the second chamber.

3. The system of claim 2, wherein the panel completely separates the first chamber and the second chamber.

4. The system of claim 2, further comprising a tether in the first chamber extending along the panel.

5. The system of claim 1, wherein the first chamber is a front airbag and the second chamber is a support airbag abutting the front airbag and the instrument panel in the inflated position.

6. The system of claim 1, wherein the front airbag assembly includes a top panel along the first chamber, and a tether in the first chamber, the tether being connected to the top panel adjacent the second chamber.

7. The system of claim 1, wherein the second chamber abuts the instrument panel in the inflated position.

8. The system of claim 1, wherein in the inflated position the second chamber is between the instrument panel and the first chamber.

9. The system of claim 8, wherein the second chamber abuts the instrument panel in the inflated position.

10. The system of claim 1, wherein the volume of the second chamber in the inflated position is less than the volume of the first chamber in the inflated position.

11. The system of claim 1, further comprising an inflator fluidly connected to at least two of the knee airbag, the first chamber, and the second chamber.

12. The system of claim 1, further comprising a deflector adjacent the knee airbag and pivotally connected to the instrument panel.

13. The system of claim 12, wherein the deflector includes a tether connected to the instrument panel.

14. A system comprising:
an instrument panel;
a windshield;
a knee airbag inflatable downwardly from a first opening in the instrument panel;
a front airbag inflatable upwardly and rearwardly from a second opening in the instrument panel and including a top panel, the first opening being spaced from the second opening;
wherein the front airbag assembly includes a first chamber inflatable to a first pressure in an inflated position and a second chamber inflatable to a second pressure in an inflated position, the second pressure being greater than the first pressure;
the second chamber being between the windshield and the first chamber in the inflated position;
the second chamber abuts the instrument panel and is spaced from the windshield in the inflated position; and
a housing fixed to the instrument panel and a tether extending from the top panel to the housing and tapering from the top panel to the housing.

15. The system of claim 14, wherein the tether extends forwardly from the housing to the top panel in an inflated position.

16. The system of claim 14, wherein the top panel includes an apex and the tether is connected forwardly from the apex.

17. The system of claim 14, further comprising a deflector adjacent the knee airbag and pivotally connected to the instrument panel.

18. The system of claim 14, further comprising a windshield, the front airbag being spaced from the windshield in an inflated position.

* * * * *